US008554151B2

(12) United States Patent
Cho et al.

(10) Patent No.: US 8,554,151 B2
(45) Date of Patent: Oct. 8, 2013

(54) METHOD AND APPARATUS FOR DATA AIDED CHANNEL QUALITY ESTIMATION

(75) Inventors: Young Geun Cho, Palo Alto, CA (US); Aditya Dua, Santa Clara, CA (US); Feng Lu, Sunnyvale, CA (US); Gokhan Mergen, Sunset Valley, TX (US); Subramanya P. N. Rao, Sunnyvale, CA (US); Abhinav Gupta, San Jose, CA (US); Parvathanathan Subrahmanya, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 12/960,283

(22) Filed: Dec. 3, 2010

(65) Prior Publication Data

US 2012/0142276 A1  Jun. 7, 2012

(51) Int. Cl.
*H04B 17/00* (2006.01)

(52) U.S. Cl.
USPC ......... 455/67.13; 455/67.11; 455/68; 455/69; 455/226.1; 455/226.3; 455/450; 455/452.1; 455/452.2; 370/329; 370/332; 370/333

(58) Field of Classification Search
USPC ........... 455/63.1, 67.11, 67.13, 68–69, 114.2, 455/226.1–226.3, 296, 450, 452.1, 452.2; 375/147–148, 227, 346, 348; 370/329, 370/332, 333
See application file for complete search history.

(56) References Cited

U.S. PATENT DOCUMENTS

| 7,184,497 | B2 * | 2/2007 | Jeske et al. ............... 375/346 |
| 7,457,588 | B2 | 11/2008 | Love et al. |
| 7,590,388 | B2 * | 9/2009 | Jones et al. ............. 455/67.13 |
| 7,649,967 | B2 * | 1/2010 | Jonsson .................. 375/346 |
| 7,672,383 | B2 * | 3/2010 | Namgoong et al. ...... 375/260 |
| 7,711,363 | B2 | 5/2010 | Gholmieh et al. |
| 7,860,198 | B2 * | 12/2010 | Montalbano ............. 375/346 |
| 8,054,914 | B2 * | 11/2011 | Waters et al. ............. 375/316 |
| 2004/0142698 | A1 | 7/2004 | Pietraski |
| 2005/0003782 | A1 | 1/2005 | Wintzell |
| 2006/0019608 | A1 | 1/2006 | Frrruumi et al. |
| 2006/0062322 | A1 | 3/2006 | Namgoong et al. |
| 2008/0181323 | A1 | 7/2008 | Waters et al. |

OTHER PUBLICATIONS

Louay M, et al., "Data-Aided Channel Estimation for Wideband CDMA", IEEE Transactions on Wireless Communications, vol. 4, No. 4, Jul. 2005, pp. 1622-1634.
International Search Report and Written Opinion—PCT/US2011/063171—ISA/EPO—Mar. 15, 2012.

* cited by examiner

*Primary Examiner* — Tuan A Tran
(74) *Attorney, Agent, or Firm* — Ramin Mobarhan

(57) ABSTRACT

Methods and apparatuses for data aided channel quality estimation using both pilot and data information are disclosed herein. In one exemplary aspect, a method for estimating channel quality in a wireless communication system is disclosed. The method comprises estimating a pilot noise variance based on a pilot signal received from a base station on a downlink and estimating a data noise variance based on a data signal received from the base station on the downlink. The method also comprises combining the pilot noise variance and the data noise variance to obtain a combined noise variance, and estimating the channel quality based on the combined noise variance.

44 Claims, 8 Drawing Sheets

METHOD AND APPARATUS FOR DATA AIDED CHANNEL QUALITY ESTIMATION

BACKGROUND

I. Field of the Invention

The present disclosure relates generally to communication, and more specifically to data aided channel quality estimation in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of User Equipments (UEs). A UE may communicate with a base station via the downlink and the uplink. The downlink (or forward link) refers to the communication link from the base station to the UE, and the uplink (or reverse link) refers to the communication link from the UE to the base station. The UE may estimate the channel quality on the downlink and transmit an indication of the channel quality (e.g., Channel Quality Indicator (CQI)) to the base station on the uplink to provide the base station with feedback of the channel quality on the downlink. The base station may use this information to dynamically allocate resources for the downlink.

Improvements in the quality of the channel quality estimation are desirable.

SUMMARY

Methods and apparatuses for data aided channel quality estimation using both pilot and data information are disclosed herein.

In one exemplary aspect, a method for estimating channel quality in a wireless communication system is disclosed. The method comprises estimating a pilot noise variance based on a pilot signal received from a base station on a downlink and estimating a data noise variance based on a data signal received from the base station on the downlink. The method also comprises combining the pilot noise variance and the data noise variance to obtain a combined noise variance, and estimating the channel quality based on the combined noise variance.

In another exemplary aspect, an apparatus for estimating channel quality in a wireless communication system is disclosed. The apparatus comprises a pilot noise estimator configured to estimate a pilot noise variance based on a pilot signal received from a base station on a downlink, and a data noise estimator configured to estimate a data noise variance based on a data signal received from the base station on the downlink. The apparatus also comprises a noise combiner configured to combine the pilot noise variance and the data noise variance to obtain a combined noise variance, and a channel quality estimator configured to estimate the channel quality based on the combined noise variance.

In yet another exemplary aspect, an apparatus for estimating channel quality in a wireless communication system is disclosed. The apparatus comprises means for estimating a pilot noise variance based on a pilot signal received from a base station on a downlink and means for estimating a data noise variance based on a data signal received from the base station on the downlink. The apparatus also comprises means for combining the pilot noise variance and the data noise variance to obtain a combined noise variance, and means for estimating the channel quality based on the combined noise variance.

In yet another exemplary aspect, a computer-program product for wireless communication is disclosed. The computer-program product comprises a computer-readable medium comprising codes executable by at least one computer to estimate a pilot noise variance based on a pilot signal received from a base station on a downlink, estimate a data noise variance based on a data signal received from the base station on the downlink, combine the pilot noise variance and the data noise variance to obtain a combined noise variance, and estimate the channel quality based on the combined noise variance.

Various aspects and features of the disclosure are described in further detail below.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For example, the techniques described herein may be used for the Evolved High-Speed Packet Access (HSPA+) standard defined by 3GPP. For clarity, certain aspects of the techniques are described below for HSPA+, although it should be appreciated that the techniques are not limited to HSPA+ and may be applied to other technologies using channel quality feedback.

Figure 1:
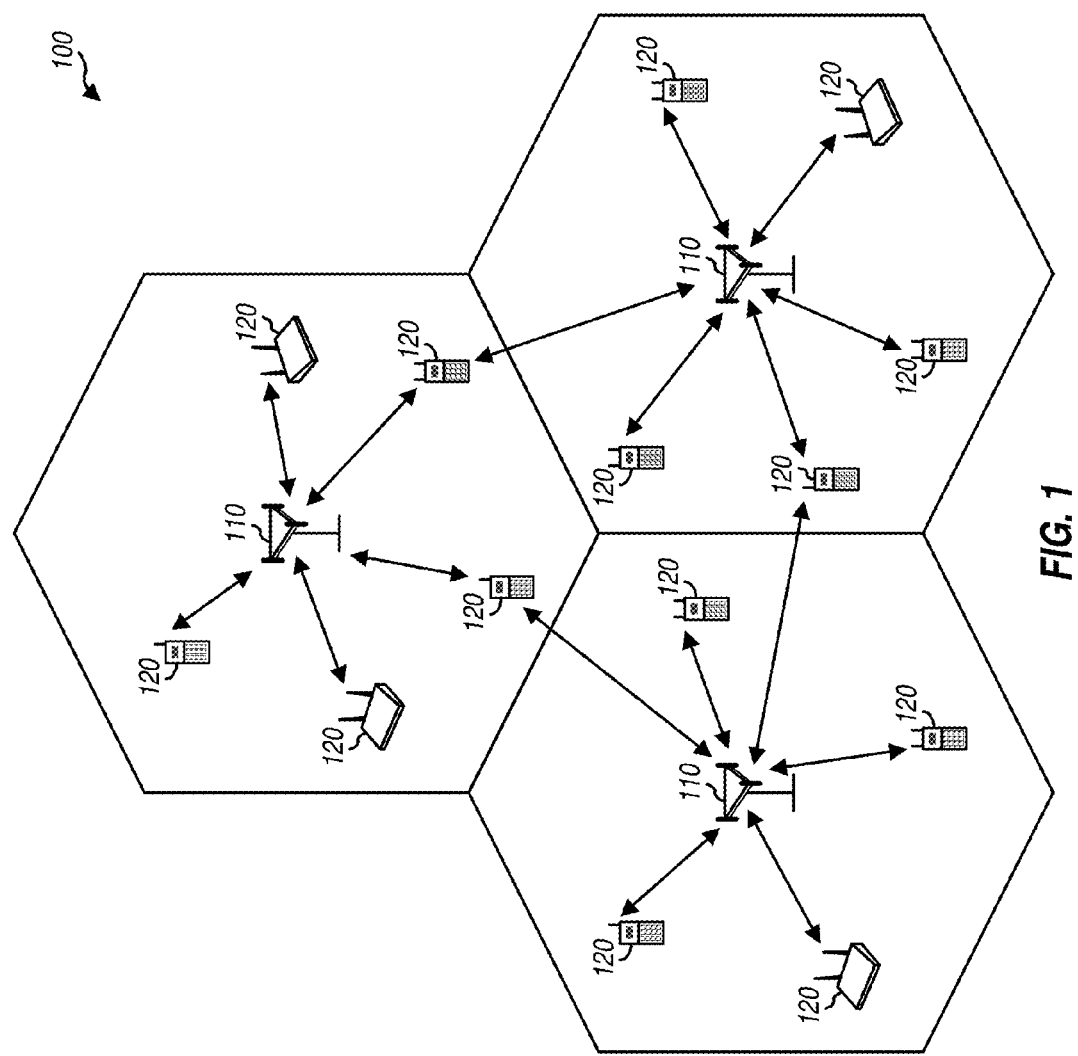
FIG. 1 shows an exemplary wireless communication system.

FIG. 1 shows an example of a wireless communication system 100 comprising multiple base stations 110 and multiple user equipments (UEs) 120. A base station 100 is generally a fixed station that communicates with the UEs 120, and may also be referred to as a Node B, an evolved Node B (eNode B), an access point, etc. Each base station 110 provides wireless communication coverage for a geographical area and supports communication for the UEs 120 within the geographical area. A system controller (not shown) may couple to the base station 110 to provide coordination and control for the base stations. The UEs 120 may be dispersed throughout the communication system 100, and each UE 120 may be stationary or mobile. A UE may also be referred to as a mobile station, a terminal, an access terminal, a subscriber unit, etc. A UE may be a cellular phone, a personal digital assistant (PDA), a wireless device, a hand-held device, a wireless modem, a laptop, etc.

Figure 2:
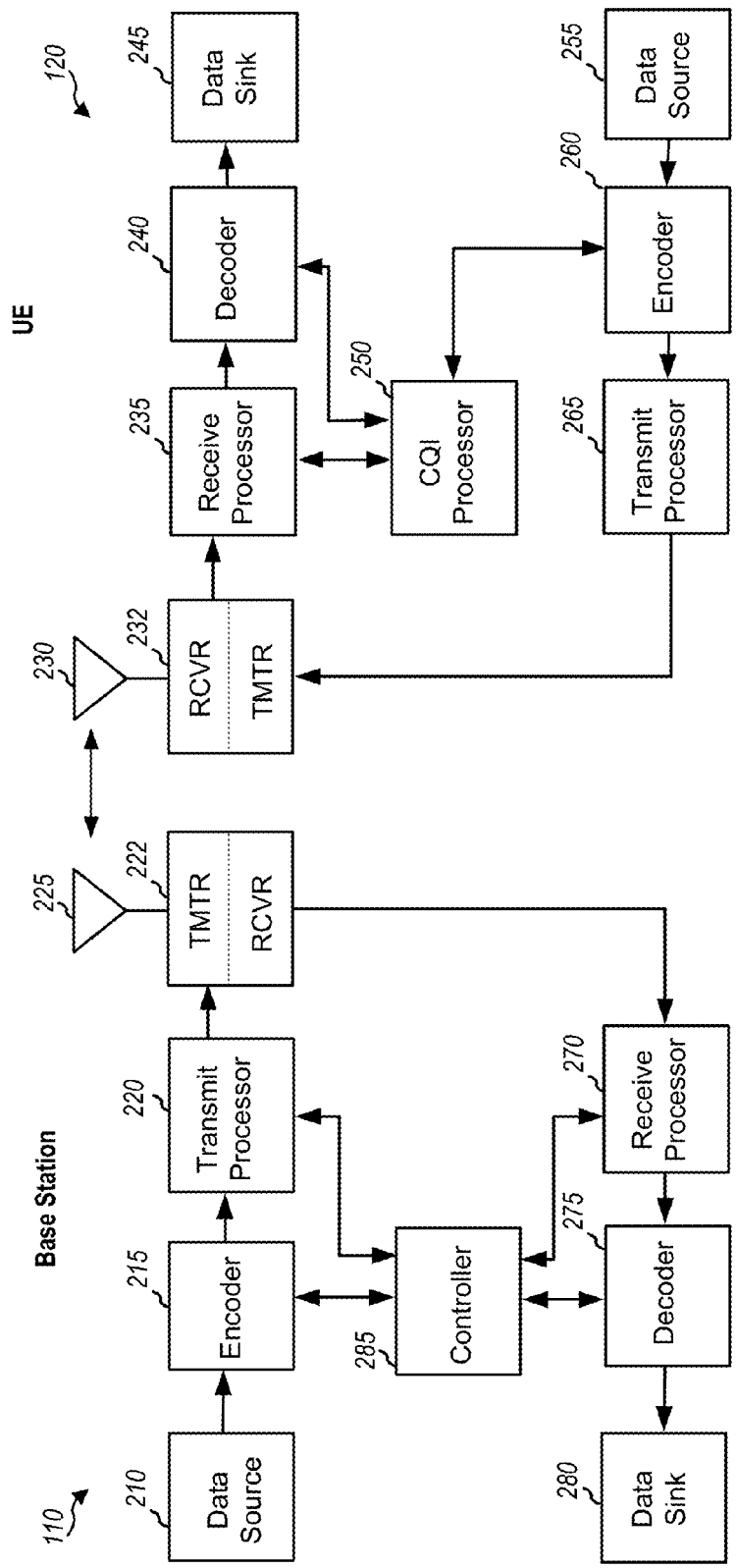
FIG. 2 shows a base station and a user equipment (UE).

FIG. 2 shows a block diagram of a base station 110 and a UE 120 according to one aspect. The base station 110 and the UE 120 may be one of the base stations 110 and UEs 120 in the wireless communication 100 shown in FIG. 1. Although operations of the base station 110 are described with reference to the UE 120 in FIG. 2 below, it should be appreciated that the base station 110 can communicate with multiple UEs 120 in the wireless communication system.

The base station 110 includes transmit circuitry to transmit data from a data source 210 to the UE 120 via one or more antennas 225. The transmit circuitry comprises an encoder 215, a transmit processor 220 and a transmitter 222. The base station 110 also includes a controller 285 to control operations of the transmit circuitry based on feedback from the UE 120, as discussed further below.

The encoder 215 is configured to receive data bits from the data source 210 and encode the data bits into coded data bits based on a coding scheme (e.g., turbo coding). The coded data bits may include redundancies to allow the UE to perform error correction on the received data. Because of these redundancies, the number of coded data bits is generally greater than the number of data bits from the data source 210. One parameter of the encoder 210 may be a code rate, which is a ratio of data bits to coded data bits. A lower code rate generally increases robustness to poor channel conditions (lower SNR) because there are more coded bits for error correction, while a higher code rate generally increases data throughput under good channel conditions because fewer coded bits need to be transmitted for a given amount of data bits. The encoder 215 may support different code rates (e.g., code rates ranging from ⅓ to 1), which may be selected by the controller 285 based on channel quality feedback from the UE 110, as discussed further below. Thus, the code rate of the encoder 215 may be dynamically adjusted based on feedback from the UE 120. The encoder 215 may also perform other functions such as interleaving, puncturing, etc.

The transmit processor 220 is configured to process the coded data bits from the encoder 215 into a transmit output signal. In one aspect, the transmit processor 220 may perform symbol modulation, in which one or more coded data bits are mapped to a symbol. Examples of symbol modulation schemes include Quadrature Phase Shift Keying (QPSK) modulation, 16 Quadrature Amplitude Modulation (16-QAM), 64-QAM, etc. QPSK modulation carries two bits per symbol, 16-QAM carries four bits per symbol and 64-QAM carries six bits per symbol. A higher level modulation scheme (e.g., 64-QAM) carries more bits per symbol, and therefore can provide higher throughput. The transmit processor 220 may support different symbol modulation schemes, which may be selected by the controller 285 based on channel quality feedback from the UE 110, as discussed further below. Thus, the modulation scheme may be dynamically selected based on feedback from the UE 120.

In one aspect, the transmit processor 220 may also channelize the data symbols onto one or more data channels by spreading the data symbols with one or more channelization codes (e.g., Orthogonal Variable Spreading Factor (OVSF) codes). In this aspect, the transmit processor 220 may allocate different numbers of OVSF codes (e.g., up to 15 OVFS codes) to the UE, which may be selected by the controller 285 based on feedback from the UE 110, as discussed further below. Thus, the transmit processor 220 may adaptively allocate available OVSF codes to the UE based on feedback from the UE 120. The UE 120 can recover data symbols from the data channels by despreading the data signal received from the base station 110 with corresponding despreading codes.

The transmit processor 220 may also support multiple-input multiple output (MIMO) transmission of the data via multiple antennas 225 by performing spatial processing (e.g., precoding).

The transmitter 222 is configured to condition the transmit output signal from the transmit processor 220 for transmission to the UE 120 via the one or more antennas 225. For example, the transmitter 222 may perform digital-to-analog conversion, amplification, filtering, frequency up-conversion, etc.

The base station 110 also transmits a pilot signal to the UE 120. The pilot signal may comprise pilot symbols, which are known a priori by the UE 120 and may used by the UE 120 to perform coherent demodulation and estimate channel quality, as discussed further below. In one aspect, the transmit processor 220 and transmitter 222 may process pilot symbols for transmission of the pilot signal to the UE on a pilot channel such as a Common Pilot Channel (CPICH) for the example of a HPSA+ implementation.

The base station 110 may also transmit configuration information to the UE 120. The configuration information may indicate the process parameters (e.g., code rate, modulation scheme, OVSF codes, etc.) for an incoming transport block of data so that the UE 120 knows how to process the data. The base station 110 may transmit the configuration information to the UE on a control channel such a High Speed Shared Control Channel (HS-SCCH) for the example of a HPSA+ implementation.

The UE 120 includes receive circuitry to process a signal received from the base station 110 via one or more antennas 230. Generally, the receive circuitry of the UE 120 may perform a reverse process of the transmit circuitry of the base station 110. The receive circuitry of the UE comprises a receiver 232, a receive processor 235 and a decoder 240. The receiver 232 is configured to condition the received signal for further processing by the receiver processor 235. For example, the receiver 232 may perform frequency down-conversion, amplification, filtering, analog-to-digital conversion etc.

The receive processor 220 is configured to process the received signal from the receiver 232 into data symbols and pilot symbols. For example, the receive processor 232 may include an equalizer and/or rake receiver to perform equalization and/or rake processing on the received signal. The receive processor 232 may also despread the received signal and process the despread signal into detected data symbols and pilot symbols, where the detected data symbols are estimates of the data symbols transmitted by the base station 110. The detected data symbols may be outputted to the decoder 240. The decoder 240 may process the detected data symbols into decoded data bits, which are outputted to a data sink 245.

The CQI processor 250 estimates a channel quality indicator (CQI) indicating the channel quality on the downlink and outputs the CQI for transmission to the base station 110 on the uplink. The CQI provides the base station 110 with feedback of the channel quality on the downlink, as discussed further below. In one aspect, the CQI processor 250 estimates the CQI based on both the pilot channel and data channel(s) for improved quality of the CQI estimation, as discussed further below.

The UE 120 also includes transmit circuitry to transmit data from a data source 255 to the base station 110 via one or more antennas 230. The transmit circuitry of the UE comprises an encoder 260, a transmit processor 265 and a transmitter 232. The encoder 260 is configured to receive data bits from the data source 255 and encode the data bits into coded data bits. The transmit processor 265 is configured to process the coded data bits from the encoder 260 into a transmit output signal. In one aspect, the transmit processor 265 may map the coded data bits to symbols based on a symbol modulation scheme and spread the symbols using one or more spreading codes. The transmit processor 265 may also perform other processes. The transmitter 232 is configured to condition the transmit output signal from the transmit processor 265 for transmission to the base station 110 via the one or more antennas 230. For example, the transmitter 232 may perform digital-to-analog conversion, amplification, filtering, frequency up-conversion, etc.

The UE 120 also transmits the CQI from the CQI processor 250 to the base station 110 on the uplink to provide the base station 110 with feedback of the channel quality on the downlink. In one aspect, the CQI may be inputted to the encoder 260 and processed by the encoder 260, the transmit processor 265 and the transmitter 232 for transmission to the base station 110 on the uplink. For the example of a HSPA+ implementation, the UE may transmit the CQI to the base station 110 on a High Speed Dedicated Physical Control Channel (HS-DPCCH).

The base station 110 includes receive circuitry to process a signal received from the UE 120 via one or more antennas 225. The receive circuitry of the base station 110 comprises a receiver 222, a receive processor 270 and a decoder 275. The receiver 222 is configured to condition the received signal for further processing by the receiver processor 270. For example, the receiver 222 may perform frequency down-conversion, amplification, filtering, analog-to-digital conversion etc. The receive processor 270 may process the received signal from the receiver 222 into data symbols, and the decoder 240 may process the detected data symbols into decoded data bits, which are outputted to a data sink 280. The decoder 275 may also recover the CQI transmitted to the base station 110 from the UE 120 and forward the received CQI to the controller 285.

As discussed further below, the controller 285 of the base station 110 may select process parameters (e.g., code rate, modulation scheme, number of OVSF codes, etc.) for the transmit circuitry of the base station 110 based on the received CQI. For example, the controller 285 may include a CQI mapping table that maps different CQIs to different process parameters (e.g., code rates, modulation schemes, number of OVSF codes, etc.) and use the CQI mapping table to map the received CQI to one or more corresponding process parameters in the CQI mapping. In one aspect, the base station 110 may transmit data to the UE in blocks referred to as transport blocks. In this aspect, the controller 285 may receive a CQI from the UE 120 and select process parameters (e.g., code rate, modulation scheme, OVSF codes, etc.) based on the CQI to process a transport block of data for transmission to the UE 120 on the downlink.

Thus, the controller 285 may adapt the process parameters (e.g., modulation scheme, coding rate, number of OVSF codes, etc.) of the transmit circuitry based on the CQI feedback from the UE 120. For example, if the CQI indicates that the channel quality on the downlink is poor, then the controller 285 may direct the transmit processor 220 to use a lower level modulation scheme (e.g., QPSK), which is more robust to poor channel conditions. If the CQI indicates that the channel quality on the downlink is good, then the controller 285 may direct the transmit processor 220 to use a higher level modulation scheme (e.g., 16-QAM or 64-QAM), which can significantly increase data throughput under good channel conditions.

Figure 3:
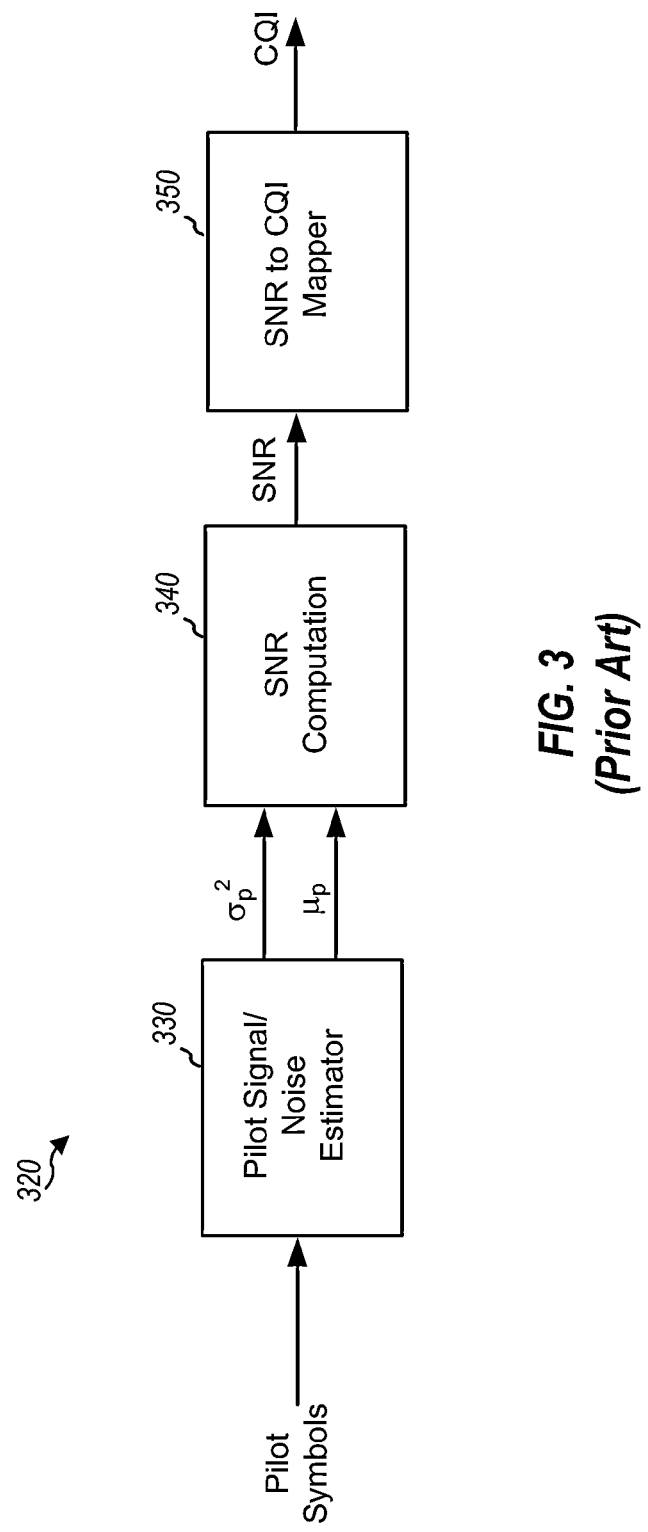
FIG. 3 shows a conventional channel quality indicator (CQI) processor that only uses the pilot channel to estimate CQI.

FIG. 3 shows a block diagram of a conventional CQI processor 320 that produces a CQI based only on the pilot channel. The CQI processor 320 receives pilot symbols, estimates a CQI based on the received pilot symbols, and outputs the CQI for transmission to a base station on the uplink. The CQI processor 320 comprises a pilot signal/noise estimator 330, a signal-to-noise ratio (SNR) computation unit 340, and a SNR to CQI mapper 350.

The pilot signal/noise estimator 330 processes the pilot symbols to generate a pilot signal amplitude estimate and a pilot noise variance estimate, denoted by $\mu_p$ and $\sigma_p^2$, respectively, which are outputted to the SNR computation unit 340. The SNR computation unit 340 then computes an SNR and outputs the SNR estimate to the SNR to CQI mapper 350, which determines a CQI based on the SNR estimate.

Figure 4:
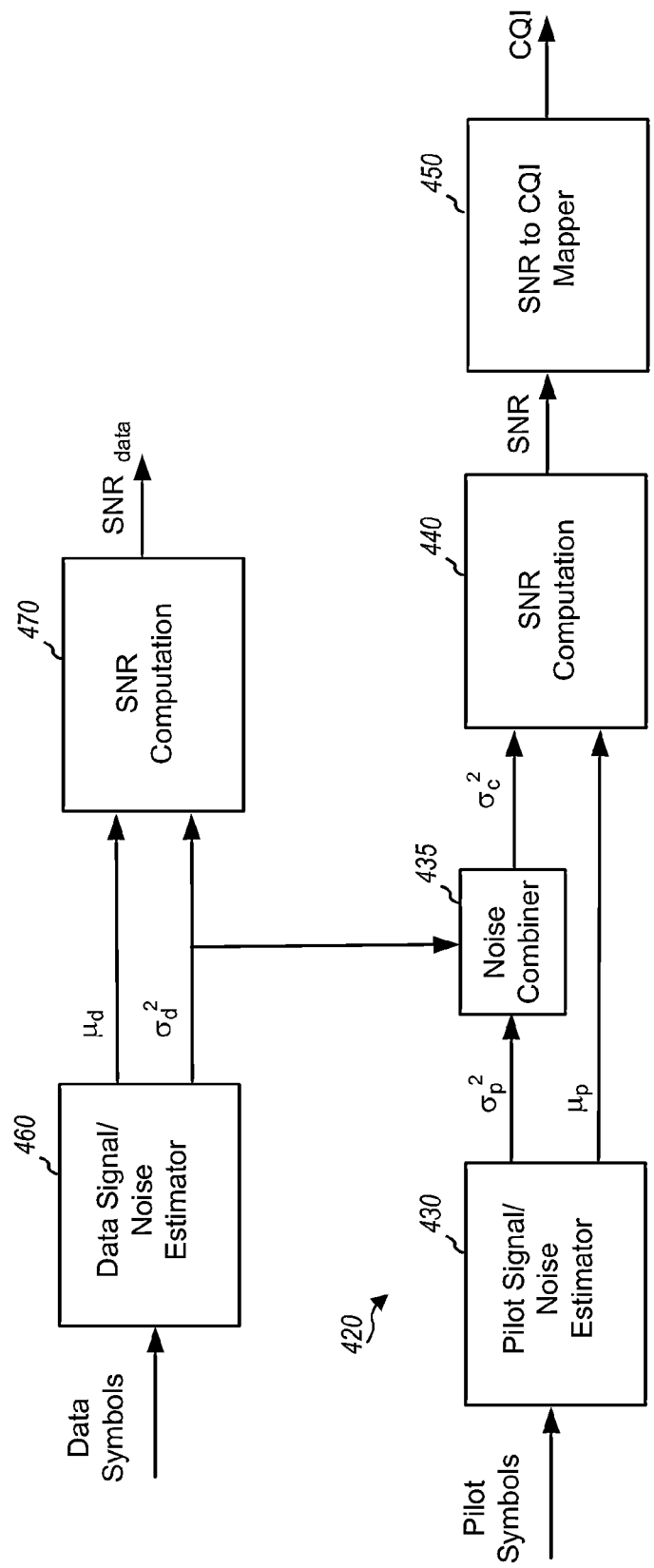
FIG. 4 shows a data aided CQI processor that uses both the pilot channel and the data channel(s) to estimate CQI.

FIG. 4 shows a block diagram of a data aided CQI processor 420 that produces a CQI based on the pilot channel and the data channel(s) according to one aspect. The CQI processor 420 comprises a pilot signal/noise estimator 430, a noise combiner 435, a signal-to-noise ratio (SNR) computation unit 440, and a SNR to CQI mapper 450. Also shown in FIG. 4 is a data signal/noise estimator 460 and a data signal-to-noise ratio (SNR) computation unit 470, which may be part of the decoder 240.

The data signal/noise estimator 460 processes the data symbols from the receive processor 235 to generate a data signal amplitude estimate $\mu_d$ and a data noise variance estimate $\sigma_d^2$, which are outputted to the data SNR computation unit 470. The data noise variance refers to a noise variance based on the data signal. The data SNR computation unit then computes a data SNR estimate for the data channel(s) as follows:

$$SNR = \mu_d^2/\sigma_d^2 \quad (1)$$

The data SNR computation unit 470 may then output the data SNR estimate (denoted by $SNR_{data}$ in FIG. 4) to another component in the decoder. For example, when the decoder 240 uses Turbo decoding, the data SNR estimate may be used by the decoder to compute log-likelihood ratio (LLR) values from the data symbols, which are used for the Turbo decoding.

The pilot signal/noise estimator 430 processes the pilot symbols to generate a pilot signal amplitude estimate $\mu_p$ and a pilot noise variance estimate $\sigma_p^2$. The pilot noise variance refers to a noise variance based on the pilot signal. The noise combiner 435 receives the pilot noise variance estimate $\sigma_p^2$ from the pilot signal/noise estimator 430 and the data noise variance estimate $\sigma_d^2$ from the data signal/noise estimator 460, and combines the pilot noise variance estimate $\sigma_p^2$ and the data noise variance estimate $\sigma_d^2$ to obtain a combined noise variance estimate $\sigma_c^2$. For example, the pilot noise variance estimate $\sigma_p^2$ and the data noise variance estimate $\sigma_d^2$ may be combined as a weighted sum of the pilot noise variance estimate $\sigma_p^2$ and the data noise variance estimate $\sigma_d^2$, as discussed further below. The combined noise variance estimate $\sigma_c^2$ results in a higher quality noise variance estimate compared with the pilot noise variance estimate $\sigma_p^2$ alone, which in turn results in a higher quality CQI. Techniques for combining the pilot noise variance estimate $\sigma_p^2$ and the data noise variance estimate $\sigma_d^2$ according to various aspects are discussed below.

The SNR computation unit 440 receives the combined noise variance estimate $\sigma_c^2$ from the noise combiner 435 and the pilot signal amplitude estimate $\mu_p$ from the pilot signal/noise estimator 430, and computes an SNR estimate as follows:

$$SNR = \mu_p^2/\sigma_c^2 \quad (2)$$

In one aspect, the pilot noise variance estimate $\sigma_p^2$ and the data noise variance estimate $\sigma_d^2$ may each represent an average or mean of the respective variance over a period of a transport block or other time period. Similarly, the pilot signal amplitude estimate $\mu_p$ may represent an average or mean of the amplitude over a period of a transport block or other time period.

The SNR computation unit 440 outputs the SNR estimate to the SNR to CQI mapper 450, which outputs a CQI based on the SNR estimate. For example, the SNR to CQI mapper 450 may include a mapping table that maps different ranges of SNR estimates to different CQIs in the set, and may map the SNR estimate to one of the CQIs based on the mapping table. In one aspect, the SNR computation unit 440 may compute the SNR estimate over one transport block and the SNR to CQI mapper 450 may output a CQI based on the SNR estimate.

In one aspect, the noise combiner 435 may compute the combined noise variance $\sigma_c^2$ as follows:

$$cw \cdot S_d \cdot \sigma_d^2 + (1-w) \cdot \sigma_p^2$$

where $\sigma_p^2$ is the pilot noise variance estimate, $\sigma_d^2$ is the data noise variance estimate, w is a weight, and $S_d$ is a linear scaling factor. The weight w may be used to adjust the relative contributions of the data noise variance estimate $\sigma_d^2$ and the pilot noise variance estimate $\sigma_p^2$ in determining the combined noise variance $\sigma_c^2$. The weight w may be a function of one or more process parameters (e.g., code rate, modulation scheme, number of OVSF codes, etc.) used by the transmit circuitry of the base station 110, as discussed further below. The weight w may range from zero to one (i.e., w∈[0,1]). The noise combiner 435 may determine the process parameters based on the configuration information received from the base station 110 on the control channel (e.g., HS-SCCH).

The scaling factor $S_d$ may be used to compensate for a gain difference between the pilot processing path and the data processing path in the receiver 232 and/or receive processor 235. The gain difference may be a fixed value depending on the implementation of the receiver 232 and/or receive processor 235. For example, the gain difference may be due to different amounts of scaling in the pilot processing path and the data processing path. The scaling factor $S_d$ may also be used to compensate for a difference between the spreading factors of the pilot channel spreading and the data channel(s). For the example of a HSPA+implementation, the pilot channel may have a spreading factor of 256 and the data channel(s) may have a spreading factor of 16.

The data aided CQI processor 420 advantageously improves the quality of the CQI estimation by estimating the CQI using information from both the pilot and data channel(s). This is because the number of data symbols available for CQI estimation can be much greater than the number of pilot symbols. For example, there may only be 30 pilot symbols available for CQI estimation every subframe. This is because the pilot channel is an overhead channel (i.e., does not carry user information), and therefore the system resources allocated to the pilot channel may be limited. On the other hand, the number of data symbols available for CQI estimation can be at least 420 for one OVSF code, and can be as large as 7,200 if 15 OVSF codes are allocated to the UE 120. The additional data samples available for CQI estimation can greatly improve the quality of CQI estimation compared with techniques that rely only on the pilot channel. The higher quality CQI estimation, in turn, improves the link level throughput on the downlink from the base station 110 to the UE 120. This is because the higher quality CQI allows the controller 285 at the base station 110 to more accurately determine the channel quality on the downlink, and therefore select one or more process parameters (e.g., code rate, modulation scheme, number of OVSF codes, etc.) that optimizes throughput on the downlink.

Performance of a data aided CQI processor 420 according to one example will now be discussed in relation to the CQI processor that only uses the pilot channel to estimate CQI. In this example, the performance is evaluated for CQI based scheduling using a UE category 14 CQI table. Performance is also evaluated for different receiver types including a rake receiver, an equalizer (EQ) receiver and a Qualcomm Interference Cancellation Engine (Q-ICE) receiver. The scaling factor $S_d$ is set to ¼ to compensate for differences between the pilot channel and data channel(s) spreading factors for HSPA+ and between the gains from pilot signal processing and data signal processing.

In this example, the weight w is a function of modulation scheme. For QPSK, the weight w equals one and for 64-QAM, the weight w equals zero. For 16-QAM, the weight w is selected as a function of the number of OVSF codes allocated to the UE on the downlink. The weights w assigned to different numbers of OVSF codes are shown in Table 1 below.

TABLE 1

| No. OVSF codes | Weight |
| --- | --- |
| 1 | 0.17 |
| 2 | 0.27 |
| 3 | 0.40 |
| 4 | 0.54 |

TABLE 1-continued

| No. OVSF codes | Weight |
|---|---|
| 5 | 0.61 |
| 6 | 0.68 |
| 7 | 0.73 |
| 8 | 0.75 |
| 9 | 0.80 |
| 10 | 0.81 |
| 11 | 0.84 |
| 12 | 0.85 |
| 13 | 0.86 |
| 14 | 0.87 |
| 15 | 0.88 |

In this example, the weight assigned to the data noise variance estimate $\sigma_d^2$ increases as the number of OVSF codes allocated to the UE increases.

Figure 5:
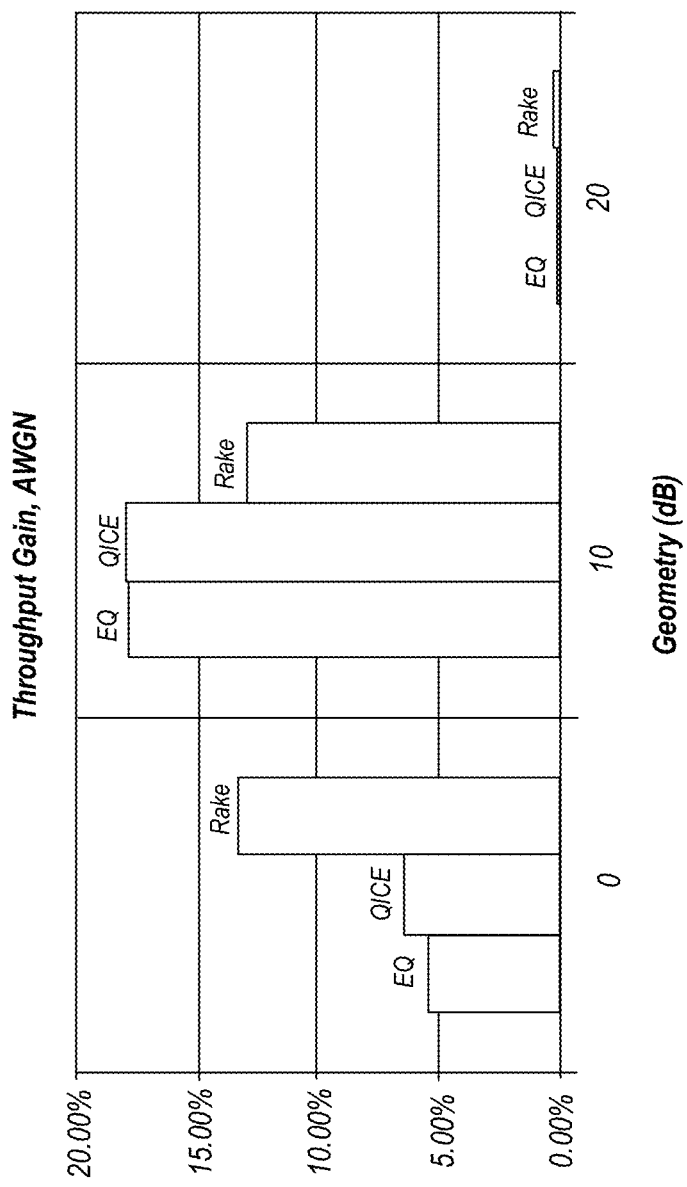
FIG. 5 shows examples of throughput gains from the data aided CQI processor under AWGN channel conditions.

FIG. 5 shows percentages of throughput gains achieved by the data aided CQI processor as a function of geometry for Additive White Gaussian Noise (AWGN) channel conditions (static channel with no multipath fading) for different receiver types (rake receiver, equalizer (EQ) receiver and Q-ICE receiver). The percentages of throughput gains are with respect to the CQI processor that only uses the pilot channel for CQI estimation. The geometry may be defined by Ior/Ioc, where Ior is received power and Ioc is the power of interference plus noise. As shown in FIG. 5, under AWGN conditions, the data aided CQI processor in this example provides throughput gains from 5% to 18%.

Figure 6:
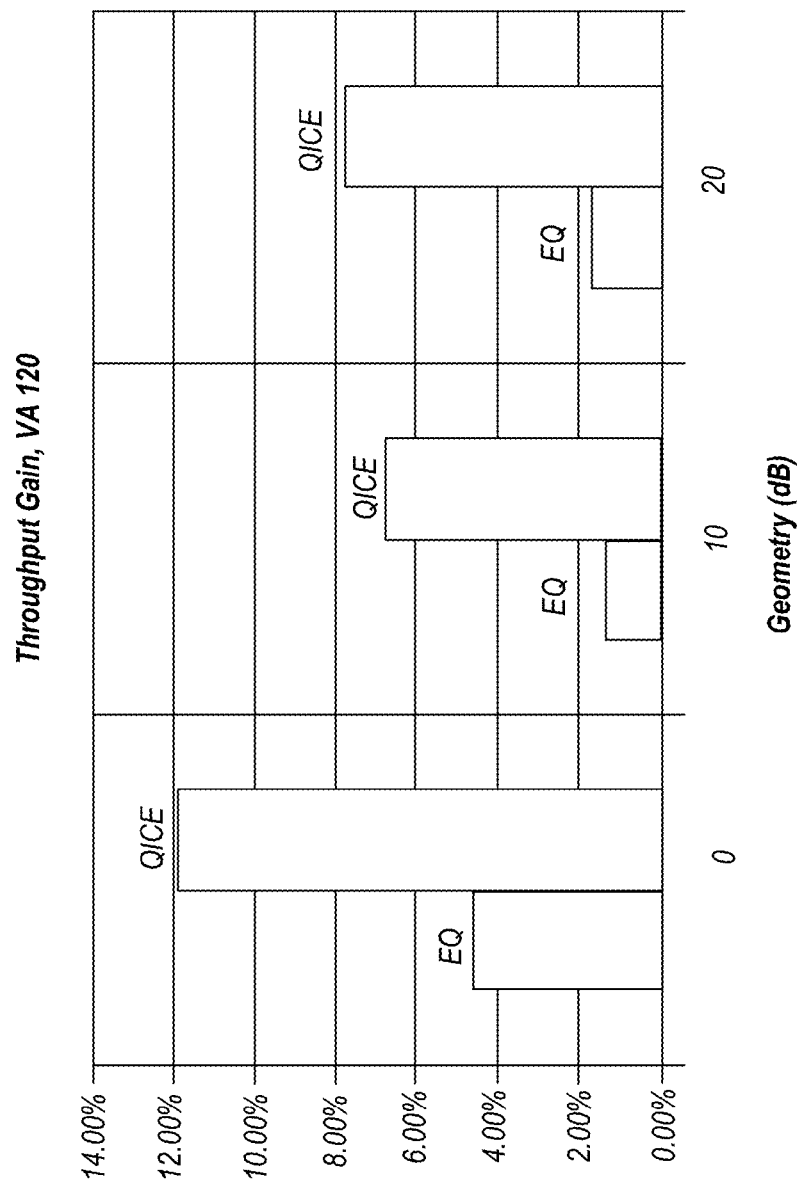
FIG. 6 shows examples of throughput gains from the data aided CQI processor under VA 120 channel conditions.

FIG. 6 shows percentages of throughput gains achieved by the data aided CQI processor as a function of geometry for VA 120 channel conditions (high speed multipath fading) for different receiver types (equalizer (EQ) receiver and Q-ICE receiver). The percentages of throughput gains are with respect to the CQI processor that only uses the pilot channel for CQI estimation. As shown in FIG. 6, under VA 120 conditions, the data aided CQI processor in this example provides throughput gains of up to 12% for low geometry.

In one aspect, the noise combiner 435 may determine the weight w applied to the data noise variance estimate $\sigma_d^2$ as a function of the modulation scheme used to modulate the data. For example, the noise combiner 435 may include a mapping table that assigns different weights to different modulation schemes and the noise combiner 435 may determine the weight for a particular modulation scheme based on the weight assigned to that modulation scheme in the table. As another example, the noise combiner 435 may assign a higher weight to a lower level modulation scheme (e.g., QPSK modulation) than a higher level modulation (e.g., 64-QAM), where the level of a modulation scheme corresponds to the number of bits per symbol for that modulation scheme. This is because the data noise variance may be more reliable for a lower level modulation scheme, which is more robust to poor channel conditions.

In another aspect, the noise combiner 435 may determine the weight w applied to the data noise variance estimate $\sigma_d^2$ as a function of the number of channelization codes (e.g., OVSF codes) used to channelize the data. For example, the noise combiner 435 may include a mapping table that assigns different weights to different numbers of codes and may determine the weight for a particular number of codes based on the weight assigned to that number of codes in the table. As another example, the noise combiner 435 may assign a higher weight to a higher number of channelization codes than a lower number of channelization codes. This is because more data can be transmitted using more channels, which results in more data being available at the UE to estimate the data noise variance.

In another aspect, the noise combiner 435 may determine the weight w applied to the data noise variance estimate $\sigma_d^2$ as a function of both the modulation scheme and the number of codes (e.g., OVSF codes) used to channelize the data. For example, the noise combiner 435 may include a mapping table for a particular modulation scheme that assigns different weights to different numbers of codes for that modulation scheme. For example, Table 1 discussed above shows an example of a mapping table that assigns different weights to different numbers of codes (e.g., OVSF codes) for the 16-QAM modulation scheme. As discussed above, the noise combiner 435 may determine the modulation scheme and codes used by the base station 110 based on the configuration information received by the receive circuitry of the UE from the base station 110 on the control channel (e.g., HS-SCCH).

Figure 7:
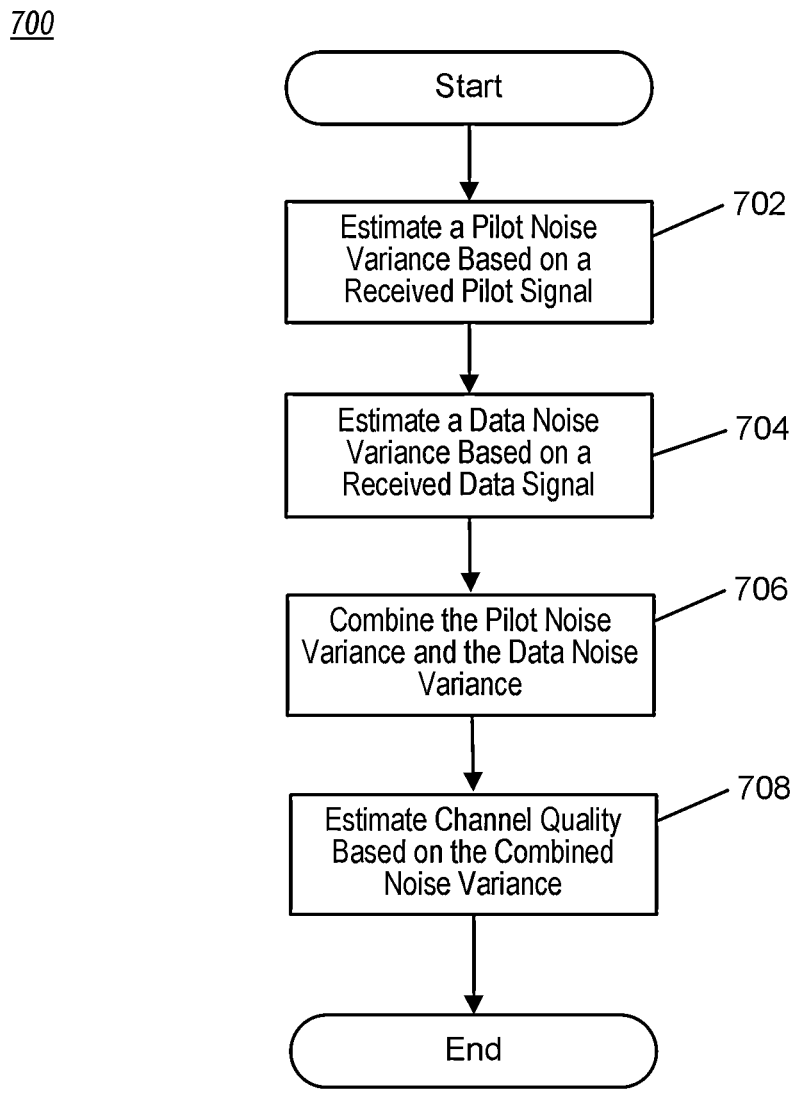
FIG. 7 is a flowchart of a method for estimating channel quality.

FIG. 7 is a flowchart illustrating a method 700 for estimating channel quality according to one aspect. The method 700 may be performed at a UE 120 to estimate channel quality on the downlink using both the pilot channel and the data channel(s).

At block 702, a pilot noise variance is estimated based on a received pilot signal. The pilot signal may be received at the UE 120 from a base station 110 on the downlink. At block 704, a data noise variance is estimated based on a received data signal. The data signal may be received at the UE 120 from a base station 110 on the downlink.

At block 706, the pilot noise variance and the data noise variance are combined to obtain a combined noise variance. For example, the pilot noise variance and the data noise variance may be combined by computing a weighted sum of the pilot noise variance and the data noise variance. In this example, the weight applied to the data noise variance may be determined as a function of the modulation scheme (e.g., QPSK modulation, 16-QAM, 64-QAM, etc.) use to modulate the data in the data signal and/or the number of codes (e.g., OVSF codes) used to channelize the data in the data signal. In addition, the pilot noise variance and/or the data noise variance may be scaled by a scaling factor to account for a gain difference between the pilot processing path and the data processing path in the receiver and/or a difference between the spreading factors of the pilot signal and the data signal.

At block 708, channel quality is estimated based on the combined noise variance. For example, the channel quality may be estimated by estimating an SNR based on an estimated pilot signal strength and the combined noise variance and mapping the SNR to one of a plurality of CQIs. The CQI may then be transmitted on the uplink to provide the base station 110 with feedback of the channel quality on the downlink.

Figure 8:
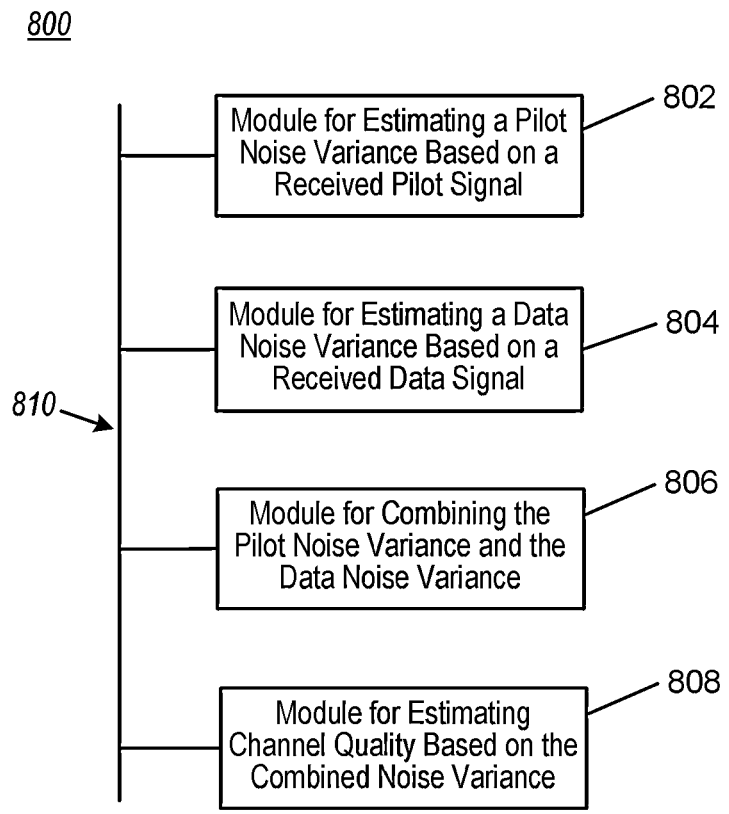
FIG. 8 is a block diagram representation of a wireless communication apparatus.

FIG. 8 is a block diagram representation of a portion of a wireless apparatus 800 (e.g., the UE 120) comprising a module 802 for estimating a pilot noise variance based on a received pilot signal and a module 804 for estimating a data noise variance based on a received data signal. The pilot signal and the data signal may be received at a UE 120 from a base station 110 on the downlink.

The portion of the wireless apparatus 800 also comprises a module 806 for combining the pilot noise variance and the data noise variance and a module 808 for estimating channel quality based on the combined noise variance. Each of the modules 802-808 may communicate with one or more of the other modules 802-808 via one or more communication paths 810. For example, the module 802 for estimating the pilot noise variance and the module 804 for estimating the data noise variance may communicate the pilot noise variance and the data noise variance, respectively, to the module 806 for combining so that the module 806 for combining can combine the pilot noise variance and the data noise variance. The module 806 for combining may then communicate the combined noise variance to the module 808 for estimating the channel quality.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and process steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for estimating channel quality in a wireless communication system, comprising:
   estimating a pilot noise variance based on a pilot signal received from a base station on a downlink;
   estimating a data noise variance based on a data signal received from the base station on the downlink;
   combining the pilot noise variance and the data noise variance independent of amplitudes of the pilot signal and the data signal to obtain a combined noise variance; and
   estimating the channel quality based on the combined noise variance.

2. The method of claim 1, wherein the estimating the channel quality based on the combined noise variance comprises:
   estimating a pilot signal amplitude based on the received pilot signal;
   computing a signal-to-noise ratio (SNR) based on the pilot signal amplitude and the combined noise variance; and
   estimating the channel quality based on the computed SNR.

3. The method of claim 1, wherein the combining the pilot noise variance and the data noise variance comprises computing a weighted sum of the pilot variance noise and the data noise variance.

4. The method of claim 3, wherein the computing the weighted sum of the pilot noise variance and the data noise variance comprises scaling the pilot noise variance or the data noise variance to account for a difference between a spreading factor of the pilot signal and a spreading factor of the data signal.

5. The method of claim 3, wherein the computing the weighted sum of the pilot noise variance and the data noise variance comprises scaling the pilot noise variance or the data noise variance to account for a gain difference between the pilot signal and the data signal.

6. The method of claim 3, wherein the computing the weighted sum of the pilot noise variance and the data noise variance comprises:
   determining a weight as a function of a modulation scheme used to modulate data in the data signal; and
   weighing the data noise variance in the weighted sum by the determined weight.

7. The method of claim 6, wherein the determining the weight as a function of the modulation scheme comprises assigning a higher weight for a lower level modulation scheme than a higher level modulation scheme.

8. The method of claim 3, wherein the computing the weighted sum of the pilot noise variance and the data noise variance comprises:
   determining a weight as a function of a number of channelization codes used to channelize data in the data signal; and
   weighing the data noise variance in the weighted sum by the determined weight.

9. The method of claim 8, wherein the determining the weight as a function of the number of channelization codes comprises assigning a higher weight for a higher number of channelization codes than a lower number of channelization codes.

10. The method of claim 9, wherein the channelization codes comprise orthogonal variable spreading factor (OVSF) codes.

11. The method of claim 1, further comprising transmitting an indication of the estimated channel quality to the base station on an uplink.

12. An apparatus for estimating channel quality in a wireless communication system, comprising:
   a pilot noise estimator configured to estimate a pilot noise variance based on a pilot signal received from a base station on a downlink;
   a data noise estimator configured to estimate a data noise variance based on a data signal received from the base station on the downlink;
   a noise combiner configured to combine the pilot noise variance and the data noise variance independent of amplitudes of the pilot signal and the data signal to obtain a combined noise variance; and
   a channel quality estimator configured to estimate the channel quality based on the combined noise variance.

13. The apparatus of claim 12, wherein the channel quality estimator comprises:
   a signal-to-noise ratio (SNR) computation unit configured to compute an SNR based on an estimated pilot signal amplitude and the combined noise variance; and
   a SNR to channel quality indicator (CQI) mapper configured to select a CQI from a plurality of CQIs based on the computed SNR.

14. The apparatus of claim 12, wherein the noise combiner is configured to combine the pilot noise variance and the data noise variance by computing a weighted sum of the pilot variance noise and the data noise variance.

15. The apparatus of claim 14, wherein the noise combiner is configured to scale the pilot noise variance or the data noise variance to account for a difference between a spreading factor of the pilot signal and a spreading factor of the data signal.

16. The apparatus of claim 14, wherein the noise combiner is configured to scale the pilot noise variance or the data noise variance to account for a gain difference between the pilot signal and the data signal.

17. The apparatus of claim 14, wherein the noise combiner is configured to compute the weighted sum of the pilot noise variance and the data noise variance by determining a weight as a function of a modulation scheme used to modulate data in the data signal and weighing the data noise variance in the weighted sum by the determined weight.

18. The apparatus of claim 17, wherein the noise combiner is configured to determine the weight as a function of the modulation scheme by assigning a higher weight for a lower level modulation scheme than a higher level modulation scheme.

19. The apparatus of claim 14, wherein noise combiner is configured to compute the weighted sum of the pilot noise variance and the data noise variance by determining a weight as a function of a number of channelization codes used to channelize data in the data signal and weighing the data noise variance in the weighted sum by the determined weight.

20. The apparatus of claim 19, wherein the noise combiner is configured to determine the weight as a function of the number of channelization codes by assigning a higher weight for a higher number of channelization codes than a lower number of channelization codes.

21. The apparatus of claim 20, wherein the channelization codes comprise orthogonal variable spreading factor (OVSF) codes.

22. The apparatus of claim 12, further comprising a transmitter configured to transmit an indication of the estimated channel quality to the base station on an uplink.

23. An apparatus for estimating channel quality in a wireless communication system, comprising:
means for estimating a pilot noise variance based on a pilot signal received from a base station on a downlink;
means for estimating a data noise variance based on a data signal received from the base station on the downlink;
means for combining the pilot noise variance and the data noise variance independent of amplitudes of the pilot signal and the data signal to obtain a combined noise variance; and
means for estimating the channel quality based on the combined noise variance.

24. The apparatus of claim 23, wherein the means for estimating the channel quality based on the combined noise variance comprises:
means for estimating pilot signal amplitude based on the received pilot signal;
means for computing a signal-to-noise ratio (SNR) based on the pilot signal amplitude and the combined noise variance; and
means for estimating the channel quality based on the computed SNR.

25. The apparatus of claim 23, wherein the means for combining the pilot noise variance and the data noise variance comprises means for computing a weighted sum of the pilot variance noise and the data noise variance.

26. The apparatus of claim 25, wherein the means for computing the weighted sum of the pilot noise variance and the data noise variance comprises means for scaling the pilot noise variance or the data noise variance to account for a difference between a spreading factor of the pilot signal and a spreading factor of the data signal.

27. The apparatus of claim 25, wherein the means for computing the weighted sum of the pilot noise variance and the data noise variance comprises means for scaling the pilot noise variance or the data noise variance to account for a gain difference between the pilot signal and the data signal.

28. The apparatus of claim 25, wherein the means for computing the weighted sum of the pilot noise variance and the data noise variance comprises:
means for determining a weight as a function of a modulation scheme used to modulate data in the data signal; and
means for weighing the data noise variance in the weighted sum by the determined weight.

29. The apparatus of claim 28, wherein the means for determining the weight as a function of the modulation scheme comprises means for assigning a higher weight for a lower level modulation scheme than a higher level modulation scheme.

30. The apparatus of claim 25, wherein the means for computing the weighted sum of the pilot noise variance and the data noise variance comprises:
means for determining a weight as a function of a number of channelization codes used to channelize data in the data signal; and
means for weighing the data noise variance in the weighted sum by the determined weight.

31. The apparatus of claim 30, wherein the means for determining the weight as a function of the number of channelization codes comprises means for assigning a higher weight for a higher number of channelization codes than a lower number of channelization codes.

32. The apparatus of claim 31, wherein the channelization codes comprise orthogonal variable spreading factor (OVSF) codes.

33. The apparatus of claim 23, further comprising means for transmitting an indication of the estimated channel quality to the base station on an uplink.

34. A computer-program product for wireless communication, comprising:
non-transitory computer-readable medium comprising codes executable by at least one computer to:
estimate a pilot noise variance based on a pilot signal received from a base station on a downlink;
estimate a data noise variance based on a data signal received from the base station on the downlink;
combine the pilot noise variance and the data noise variance independent of amplitudes of the pilot signal and the data signal to obtain a combined noise variance; and
estimate the channel quality based on the combined noise variance.

35. The computer product of claim 34, wherein the code to estimate the channel quality based on the combined noise variance comprises code to:
estimate pilot signal amplitude based on the received pilot signal;
compute a signal-to-noise ratio (SNR) based on the pilot signal amplitude and the combined noise variance; and
estimate the channel quality based on the computed SNR.

36. The computer product of claim 34, wherein the code to combine the pilot noise variance and the data noise variance comprises code to compute a weighted sum of the pilot variance noise and the data noise variance.

37. The computer product of claim 36, wherein the code to compute the weighted sum of the pilot noise variance and the data noise variance comprises code to scale the pilot noise variance or the data noise variance to account for a difference between a spreading factor of the pilot signal and a spreading factor of the data signal.

38. The computer product of claim 36, wherein the code to compute the weighted sum of the pilot noise variance and the data noise variance comprises code to scale the pilot noise variance or the data noise variance to account for a gain difference between the pilot signal and the data signal.

39. The computer product of claim 36, wherein the code to compute the weighted sum of the pilot noise variance and the data noise variance comprises code to:
determine a weight as a function of a modulation scheme used to modulate data in the data signal; and
weigh the data noise variance in the weighted sum by the determined weight.

40. The computer product of claim 39, wherein the code to determine the weight as a function of the modulation scheme comprises code to assign a higher weight for a lower level modulation scheme than a higher level modulation scheme.

41. The computer product of claim 36, wherein the code to compute the weighted sum of the pilot noise variance and the data noise variance comprises code to:
determine a weight as a function of a number of channelization codes used to channelize data in the data signal; and
weigh the data noise variance in the weighted sum by the determined weight.

42. The computer product of claim 41, wherein the code to determine the weight as a function of the number of channelization codes comprises code to assign a higher weight for a higher number of channelization codes than a lower number of channelization codes.

43. The computer product of claim 42, wherein the channelization codes comprise orthogonal variable spreading factor (OVSF) codes.

44. The computer product of claim 34, further comprising code to transmit an indication of the estimated channel quality to the base station on an uplink.

* * * * *